March 22, 1966     W. A. HAMILTON     3,241,854
MOTOR VEHICLE SEMI-ELLIPTIC SPRING SUSPENSION
Filed March 18, 1964
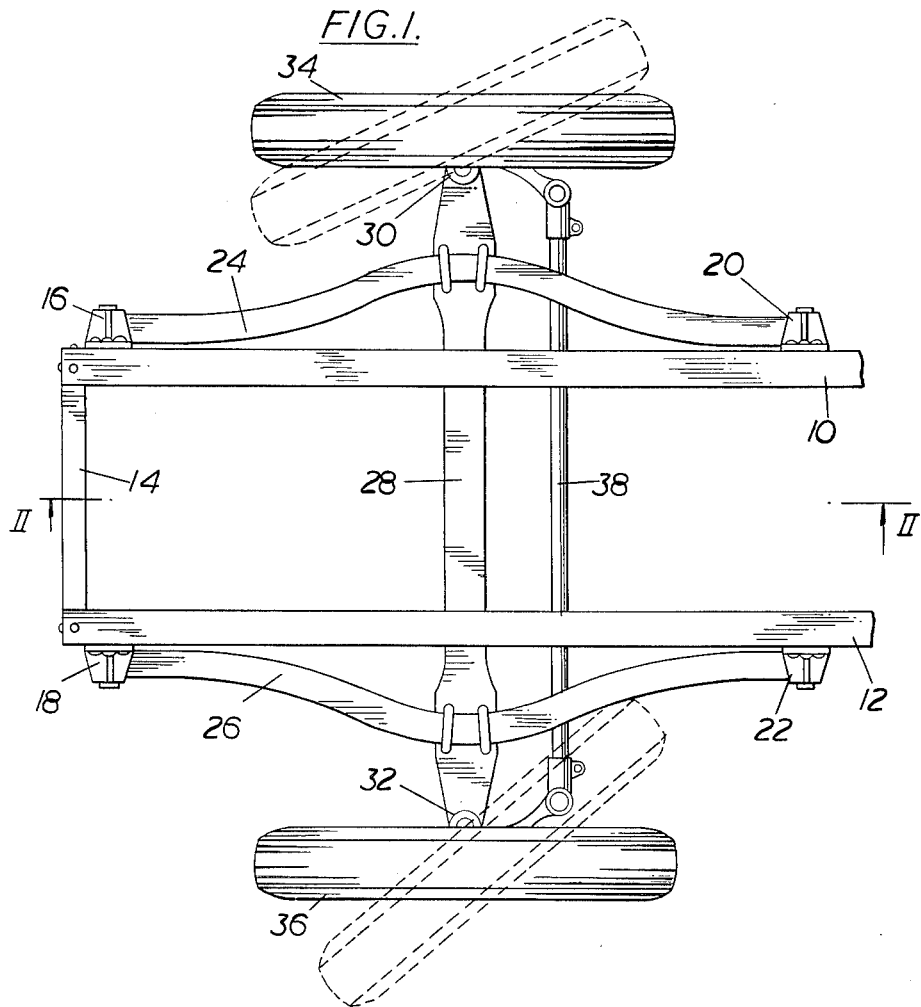
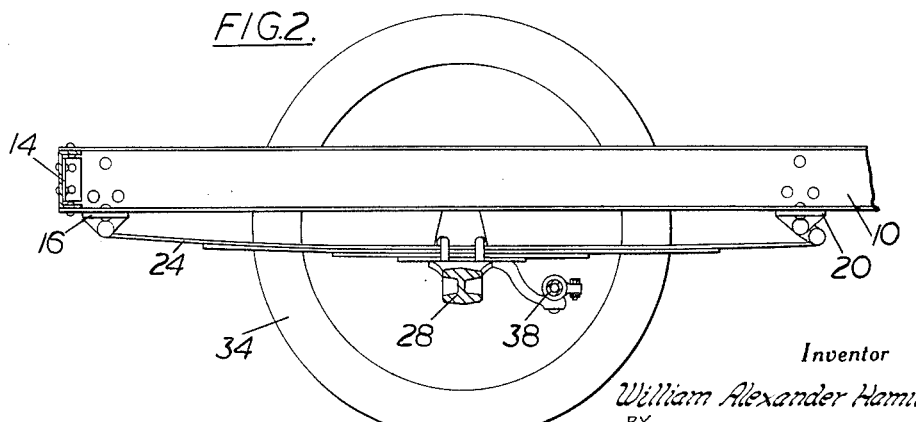
Inventor
William Alexander Hamilton
BY *W. F. Wagner*
Attorney

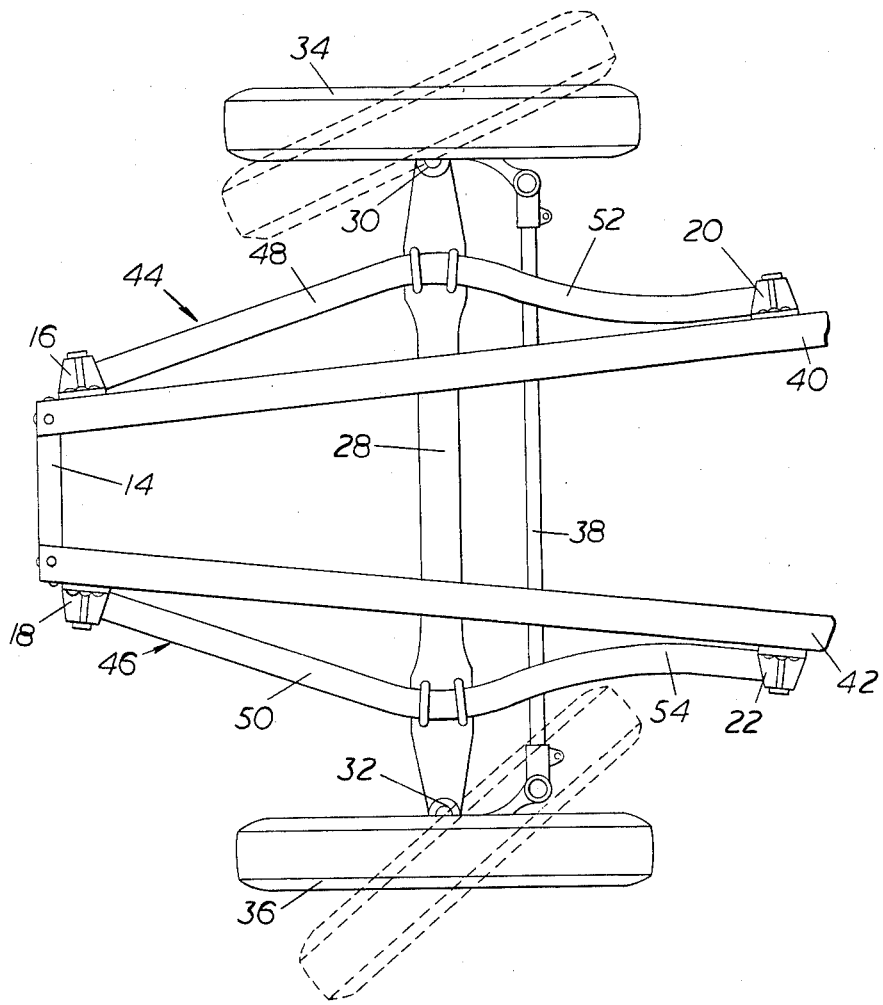

United States Patent Office 3,241,854
Patented Mar. 22, 1966

3,241,854
MOTOR VEHICLE SEMI-ELLIPTIC
SPRING SUSPENSION
William Alexander Hamilton, Luton, England, assignor to General Motors Corporation, Detroit, Mich., a corporation of Delaware
Filed Mar. 18, 1964, Ser. No. 352,842
Claims priority, application Great Britain, May 9, 1963, 18,459/63
4 Claims. (Cl. 280—95)

This invention relates to motor vehicle suspensions in which a rigid axle is resiliently connected to the vehicle body or frame by means of generally longitudinally extending semi-elliptic springs.

A difficulty in using such a configuration for a front axle is that the steerable wheels require sufficient room to lock, so that the attachment points of conventionally shaped semi-elliptic springs to the axle have to be a considerable distance inboard of the wheels. Roll stability is thereby impaired, because roll stiffness is proportional to the square of the distance between the attachment points of the two springs to the axle.

An object of the present invention is to overcome this difficulty.

According to the present invention, from one aspect, a rigid front axle is resiliently connected to the sprung portion of the vehicle by a pair of generally longitudinally extending semi-elliptic springs which are bowed as seen in plan to allow the front wheels to attain their full lock position. The attachment points of such bowed semi-elliptic springs to the axle can be considerably closer to the king pins of the steerable wheels than with the conventional straight semi-elliptic springs, thereby increasing roll stiffness and accordingly giving a useful increase in roll stablity.

Bending moments on the axle are also reduced, so that the axle can be made lighter, thereby reducing production costs.

From another aspect, a suspension according to the invention for the rigid front axle of a motor vehicle comprises a pair of generally longitudinally extending semi-elliptic springs which are bowed as seen in plan such that the center line of each spring at a point between the middle and the end of the spring is inboard of the center line of the spring in the middle of the spring.

From another aspect, a suspension according to the invention for the rigid front axle of a motor vehicle comprises a pair of generally longitudinally extending semi-elliptic springs which are bowed as seen in plan such that the center line of each spring at points between the mid-portion and each end of the spring is inboard of the center line of the spring at the mid-portion of the spring.

The center line of each spring at one or both of its ends may be substantially in the longitudinal plane passing through the center line of the spring in the middle of the spring, or at one or both of the ends of the spring may be inboard of this longitudinal plane.

The torsional forces set up during deflection within semi-elliptic springs which in accordance with the invention are bowed as seen in plan results in the material constituting the spring being used in a particularly efficient manner.

The scope of the monopoly is defined by the appended claims; the invention and how it can be performed are hereinafter particularly described with reference to the accompanying drawings, in which:

FIGURE 1 is a plan of the front end of the chassis of a motor vehicle fitted with one embodiment of a suspension according to the present invention;

FIGURE 2 is a longitudinal section on the center line II—II of FIGURE 1, in the direction of the arrows; and FIGURE 3 is a plan generally similar to FIGURE 1 but illustrating a second embodiment of a suspension according to the present invention.

In the embodiment shown in FIGURES 1 and 2 the front end of a motor vehicle chassis comprises a pair of parallel longitudinally extending frame members 10 and 12 the front ends of which are interconnected by a frame cross member 14 which has a channel-like cross-section and is bolted to the respective longitudinally extending frame members. The frame members 10 and 12 have front spring mounting brackets 16 and 18 respectively, and rear spring mounting brackets 20 and 22 respectively, bolted to them at longitudinally spaced points.

A pair of generally longitudinally extending semi-elliptic springs 24 and 26 are shackled between the front and rear spring mounting brackets at the respective sides of the vehicle chassis, the middle portions of the springs being attached to the end portions of a rigid front axle 28 at points close to respective king pins 30 and 32. A pair of road wheels 34 and 36 carried by the rigid axle can be turned about the axes of the king pins by a steering mechanism including a drag link 38 between the straight-ahead position shown in full lines and full lock positions such as the left-hand full lock position shown by the interrupted lines for the wheel 36.

Each of the generally longitudinally extending semi-elliptic springs 24 and 26, as seen in plan view, is formed with an outwardly bowed curvilinear mid-portion so as to allow the front wheels to attain their full lock positions, the center line of each spring towards and at both ends of the spring being inboard of the longitudinal plane passing through the center line of the spring in the middle of the spring.

The bowed configuration of the semi-elliptic springs 24 and 26 thus allows the springs to be attached to the axle at points closely inboard of the king pins and the steerable wheels, resulting in good roll stability together with the possibility of having a large lock angle. By way of comparison, if conventional straight semi-elliptic springs were attached to the axle at the same points the lock angle would be only that corresponding to the full-lock position indicated by the interrupted lines for the wheel 34, a larger lock angle being possible with the conventional straight springs only by moving the attachment points to the rigid axle in an inboard direction, so reducing the roll stability.

The modified embodiment shown in FIGURE 3 is for the most part identical with the embodiment described with reference to FIGURES 1 and 2, and like reference numerals are used for like parts. However, in the embodiment shown in FIGURE 3 the vehicle chassis includes frame members 40 and 42 which are non-parallel and do not extend strictly longitudinally, but converge towards a point forwardly of the frame cross member 14. To compensate for the convergence of the frame members, in this embodiment there are semi-elliptic springs 44 and 46 which are not symmetrical about their mid-point portion but are essentially Z-shaped. Namely they comprise converging straight portions 48 and 50 respectively extending forwardly from the mid-portions of the springs, and outwardly concave curved portions 52 and 54 respectively extending rearwardly from the mid-portions of the springs. The springs 44 and 46 act between the rigid axle 28 and the vehicle frame in much the same way as the springs 24 and 26 in the first embodiment.

Various changes in the embodiments which have just been described by way of example are possible within the scope of the appended claims.

I claim:
1. A motor vehicle suspension comprising a rigid axle, a pair of road wheels dirigibly mounted at the ends of said axle, steering means for effecting dirigible movement of the road wheels, a sprung portion of the vehicle spaced from said rigid axle, and means resiliently interconnecting the rigid axle and sprung portion of the vehicle, said means comprising a pair of generally longitudinally extending semi-elliptic springs having laterally outwardly bowed midportions connected to said axle to provide lateral stability and laterally inwardly swept end portions connected to said sprung portion permitting optimum turning angle of said dirigible wheels.

2. A motor vehicle suspension according to claim 1 wherein the centerline of each spring adjacent its ends is inboard of the longitudinal plane passing through the centerline of the midportion of said spring.

3. A motor vehicle suspension according to claim 2 wherein each of the semi-elliptic springs is essentially symmetrical as seen in plan view.

4. A motor vehicle suspension according to claim 2 wherein one of the end portions of each of the semi-elliptic springs is swept curvilinearly as seen in plan view.

References Cited by the Examiner

UNITED STATES PATENTS

| | | | |
|---|---|---|---|
| 398,008 | 2/1889 | Thomas | 267—40 |
| 1,188,684 | 6/1916 | Serrell | 267—52 |
| 1,450,370 | 4/1923 | Huebner | 267—36 |
| 1,475,170 | 11/1923 | Carter | 267—47 |
| 2,049,555 | 8/1936 | Zaparka | 267—47 X |
| 2,396,528 | 3/1946 | Peach | 267—40 X |

BENJAMIN HERSH, *Primary Examiner.*

KENNETH H. BETTS, *Examiner.*